United States Patent [19]
Kuwabara

[11] 3,796,051
[45] Mar. 12, 1974

[54] WATER TURBINE CONTROL MEANS
[75] Inventor: Takao Kuwabara, Hitachi, Japan
[73] Assignee: Hitachi, Ltd., Tokyo, Japan
[22] Filed: Sept. 21, 1972
[21] Appl. No.: 291,024

[30] Foreign Application Priority Data
Sept. 23, 1971 Japan.............................. 46-74384

[52] U.S. Cl. ................................................ 60/398
[51] Int. Cl............................................ F16h 41/04
[58] Field of Search .......... 60/398, 8, 10, 325, 347, 60/353, 355

[56] References Cited
UNITED STATES PATENTS
1,273,704  7/1918  White .................................. 60/325
1,751,667  3/1930  Taylor.................................. 60/398

*Primary Examiner*—Edgar W. Geoghegan
*Attorney, Agent, or Firm*—Craig and Antonelli

[57] ABSTRACT

In a control means of a water turbine generator, it has been known that the inertia effect of water in a water conduit for directing water to the turbine has an adverse effect on the controllability of the water turbine. In this view, said control means is combined with means for imitating the inertia effect to compensate the inertia of the water in the conduit, so that the controllability of the water turbine is improved.

3 Claims, 6 Drawing Figures

WATER TURBINE CONTROL MEANS

The present invention relates to a control means for a water turbine generator, and more particularly to a control means for controlling turbine output in accordance with the load and speed of the water turbine generator.

In a water turbine generator unit, the output frequency is usually varied during transient period of load change, so that the change in the output frequency is detected by a governor to control the turbine output in accordance with the load. However, in an actual practice, it is impossible to have a water turbine output smoothly controlled without any time delay in accordance with the operation of a governor, but the water turbine output $P$ is controlled in response to the governor output $Y$ such as a guide vane opening with a substantial time delay $t_1$ and $t_2$ as shown in FIG. 1. Further, the turbine output is changed in the sense opposite to the desired one during the transient period. This phenomenon is considered as being caused by the inertia of water in water conduit. Referring now to FIG. 2, the reference characters $L_1$ to $L_4$ show lengths of sections of a water conduit 1 having a uniform diameter, $V_1$ to $V_4$ average water velocities in m/sec at the sections $L_1$ to $L_4$, respectively, and $H_0$ an effective water head for a water turbine 4 in meter from an upper water reservoir 2 to a lower water reservoir 3. In this arrangement, the effect of inertia is a function of $(\Sigma L_i V_i)/H_0 \cdot g$, where $L_i$ represents each of the length $L_1$ to $L_4$, $V_i$ the mean water velocity at the section $L_i$ and $g$ the acceleration of gravity. Since an inlet valve 5 is in normally opened position, the water pressure in the conduit 1 is increased when a guide vane 6 is suddenly moved in a closing direction, so that the effective water head $H_0$ is correspondingly increased. As the guide vane 6 is closed, the water turbine output $P$ is gradually decreased and, after a certain time delay, the output $P$ reaches a value corresponding to the guide vane opening. It has been known that the relationship between the water turbine output and the guide vane opening can be approximately represented by the following equation $$P/Y = (1-T_w \cdot D)/(1+0.5\, T_w \cdot D)$$

when the water turbine is operated under a partial load:

$$P/Y = (1-G_0 \cdot T_w \cdot D)/(1+0.5\, G_0 \cdot T_w \cdot D) \quad (1)$$

where:

$$T_w = (\rho L_i V_i)/H_0 \cdot g$$

$P$ is the water turbine output in non-dimensional form;
$Y$ is the guide vane opening in non-dimensional form;
$G_0$ is the ratio of the actual load to the full load;
$D$ is the Laplace operator; and
$T_w$ is the time constant.

The equation 1 is widely used in theoretical calculation of a water conduit. As apparent from the equation 1, when the guide vane opening $Y$ or the governor output is changed stepwise as shown by the Example 2 in FIG. 1, the water turbine output $P$ is changed to negative direction during the period $t_2$ and thereafter to positive direction until a desired value ($a$) is obtained. Thus, the response of the water turbine output is not only delayed with respect to the operation of the governor but also changed in the negative direction during the transient period, so that the controllability of the water turbine is adversely affected. Hithertofore, it has been proposed to increase damping gain $\delta$ and the time constant $T_n$ of a governor to decrease the rate of response in order to eliminate the above problem. However, it should be noted that, in view of increase of modern large sized steam power plants, a water power plant has come to have a purpose of peak load adjustment, so that it is required to have a rapid responsive turbine governor. For this reason, it has also been proposed to provide a high damping before the plant is connected to an electric power supply system in order to stabilize the controllability of the water turbine governor, but eliminate such damping after the plant is connected to the power supply system because, in the latter case, a stable operation can be easily be obtained. However, if all of power plants connected to the same power supply system have no damping means, there may be possibility that the stability of the whole system is disturbed resulting in fluctuation of the system output. With respect to the relationship between the effect of the water conduit and a high damping provision, which has an important effect on the stability, a reference is made to FIG. 3 which shows a diagram originally made by L. M. Hovey and in which the stability of the plant is shown in terms of the time constant $T_w$ of the water conduit, the time constant $T_m$ of the inertia of rotating parts, the damping gain $\delta$ and the damping time constant $T_n$. The time constant $T_m$ can be represented by the equation $$T_m = WR^2 \cdot N_0^2 \times 10^{-6}/1.61\ HP$$

where:

$WR^2$ is the inertia in lbs·ft² of a water turbine generator;

$HP$ is the rated output of the water turbine in horsepower; and $N_0$ is the number of rotations in r.p.m. of the water turbine.

It should be noted in FIG. 3 that the stability of the control system is increased as the damping gain $\delta$ or the time constant $T_n$ is increased. However, as shown in FIG. 4, the governor time constant $T_g$, which is defined as the time during which the output reaches 63 percent of the step input, is gradually increased. In other words, the rate of response is gradually decreased. This is the reason why the damping is eliminated after the plant is connected to the power supply system. However, as described before, this manner of solution produces a problem in the stability of the whole system. Considering that the water pressure in the water conduit is the primary cause of instability, the inner diameter of the conduit may be increased to decrease the water flow speed, or a surge tank or a pressure regulator may be provided. However, this manner of solution is not practically recommendable because complicated equipment is required. Further, it has also been proposed to utilize the acceleration of the water turbine as well as the speed thereof as an input of the governor. In this method, various operations are performed to the input signals water turbine speed which includes the effect of the water conduit, and the load signal as the input signal. Therefore, it is difficult to separate the factor of the water conduit from other factors in order to provide a direct and effective solution to the adverse effect of the water conduit.

SUMMARY OF THE INVENTION

The present invention has an object to provide an improved governor which can counterbalance the effect of a water conduit so as to reduce instability of a governor control system due to the inertia effect of water in the water conduit which direct the water to a water turbine.

According to the present invention, a water turbine governor for controlling speed and output of a water turbine by adjusting the opening of a guide vane is further provided with means for simulating the inertia effect of the water in a water conduit for a water turbine, so as to compensate any factor which has an adverse effect on the governor control system due to the inertia effect of the water in the water conduit. Thus, according to the present invention, the damping property of the governor can be minimized and therefore the rate of response of the water turbine can be improved.

DESCRIPTION OF THE PREFERRED EMBODIMENT

Figure 5:
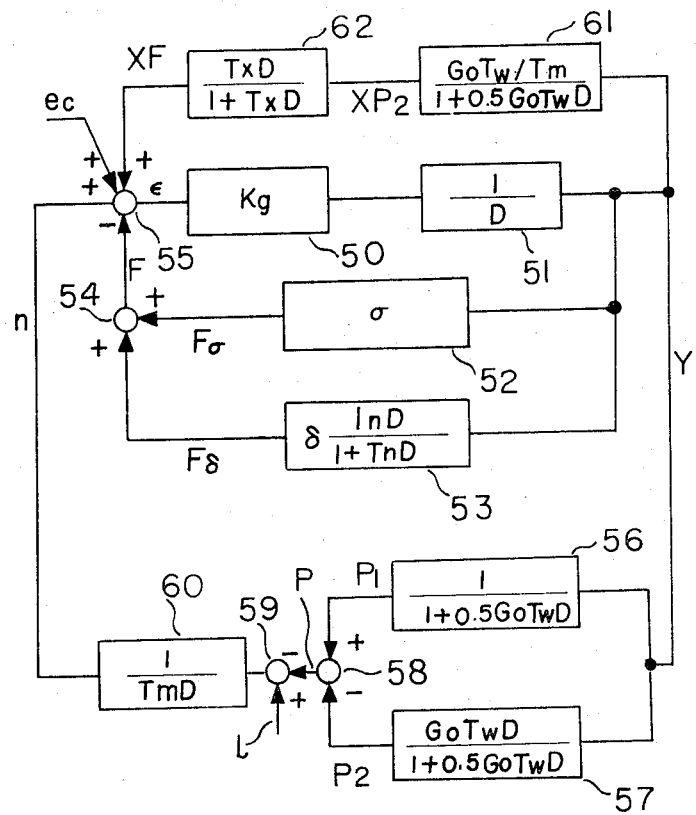
FIG. 5 is a block diagram of a governor system provided with a compensation water circuit in accordance with the present invention; and, FIG. 6 is a circuit diagram showing an embodiment of a water governor in accordance with the present invention.

The present invention will now be described taking reference to the accompanying drawings. Referring to FIG. 5 which shows the principle of the present invention in a block diagram, the reference character $e_c$ designates a reference speed signal of a water turbine, $n$ an actual speed signal of the water turbine, and $F$ a signal which is the sum of a signal $F\delta$ representing a feedback signal swing speed drop of a governor and a signal $F\delta$ representing the damping property of the governor. The reference character $\epsilon$ designates a total signal of the signals $e_c$, $F$, and $n$, and introduced into the governor. The reference numeral 50 designates a black box representing a speed detecting gain $Kg$, and 51 a black box representing a hydraulic servo mechanism $1/D$ having an integrating function. The governor input signal $\epsilon$ is transmitted through the black boxes 50 and 51 as a servo motor, turbine guide vane, opening signal $Y$. The numeral 52 designates a black box representing the speed drop $\delta$ of the governor, and 53 a black box representing the damping property $\delta \cdot T_n \cdot D/(1+T_n \cdot D)$ of the governor. The servo motor opening signal $Y$ is fed back through the boxes 52 and 53 to the input side. The numerals 56 and 57 designate black boxes simulating inertia effects of water in the water conduit to represent respectively an item necessary for the control and an item having an adverse effect on the control. These black boxes receive the servo motor opening signal $Y$ as the input signal and produce an output signal which is introduced in the form of a deviation signal with a load signal $l$ into a black box representing the inertia effect $1/T_m \cdot D$ of the water turbine 60. The transmitting function $\delta \cdot T_n \cdot D/(1+T_n \cdot D)$ of the damping property of the governor 53 is in the form of a differentiation and normally does not have any permanent gain to have effect only on the transient response characteristics. The signal from the inertia effect 60 of the water turbine is fed back into the input of the governor as a speed signal $n$. The numerals 54, 55, 58 and 59 designate signal mixing points. From the equation 1, the water conduit is represented approximately as follows:

$$P/Y = (1 - G_0 \cdot T_w \cdot D)/(1 + 0.5 \ G_0 \cdot T_w \cdot D)$$

$$= 1/(1+0.5 \ G_0 \cdot T_w \cdot D) - 2(0.5 \ G_0 \cdot T_w \cdot D)/(1+0.5 \ G_0 \cdot T_w \cdot D)$$

In the above equation, the first item represents the component which is required for the control and serves to decrease the turbine output as the turbine speed increases, and increases the turbine output as the turbine speed decreases, so that the turbine speed is maintained at a substantially constant rated speed. The second item has a function opposite to the normal governor operation and represents a signal having an adverse effect on the governor operation. This signal is transmitted through the transmitting function $1/T_m \cdot D$ representing the inertia effect of the water turbine generator and thereafter fed back into the input of the governor. Thus, when the servo motor opening $Y$ is selected as an input and the rotating speed n as an output, the total transmitting function of this item is represented by the following equation:

$$Y/n = G_0 \cdot T_w \cdot /[T_m(1+0.5 \ G_0 \cdot T_w \cdot D)]. \tag{2}$$

If the governor is provided with a minor loop between the servo motor output $Y$ and the servo motor input $n$ with a transfer function which is the same in amount as but opposite in sign to the equation 2, the water turbine control system can have the item representing the adverse water pressure effect counterbalanced. Referring to the block diagram of FIG. 5, the compensation circuit comprises a simulating circuit 61 for simulating the transmitting function $G_0(T_w/T_m)/(1+0.5 \ G_0 \cdot T_w \cdot D)$, and the servo motor opening signal $Y$ is introduced into the simulating circuit 61 as an input signal and the output signal $XP_2$ therefrom is fed back to the input of the governor. The compensation circuit further comprises a differentiating circuit 62 representing the transmitting function $T_x \cdot D/(1+T_x \cdot D)$ in series with the simulating circuit 61. The differentiating circuit 62 responds only transiently to the input and has no effect in an equilibrium state. Without the differentiating circuit 62, the compensation circuit comprising the simulating circuit 61 will have a gain even in a equilibrium state, so that the governor gain $(Y/n)$ $t = \infty$ does not have a value $1/\delta$. Thus, the compensation circuit is intended to be effective to improve the transient responsive characteristics but have no effect on the gain in equilibrium state.

Figure 6:
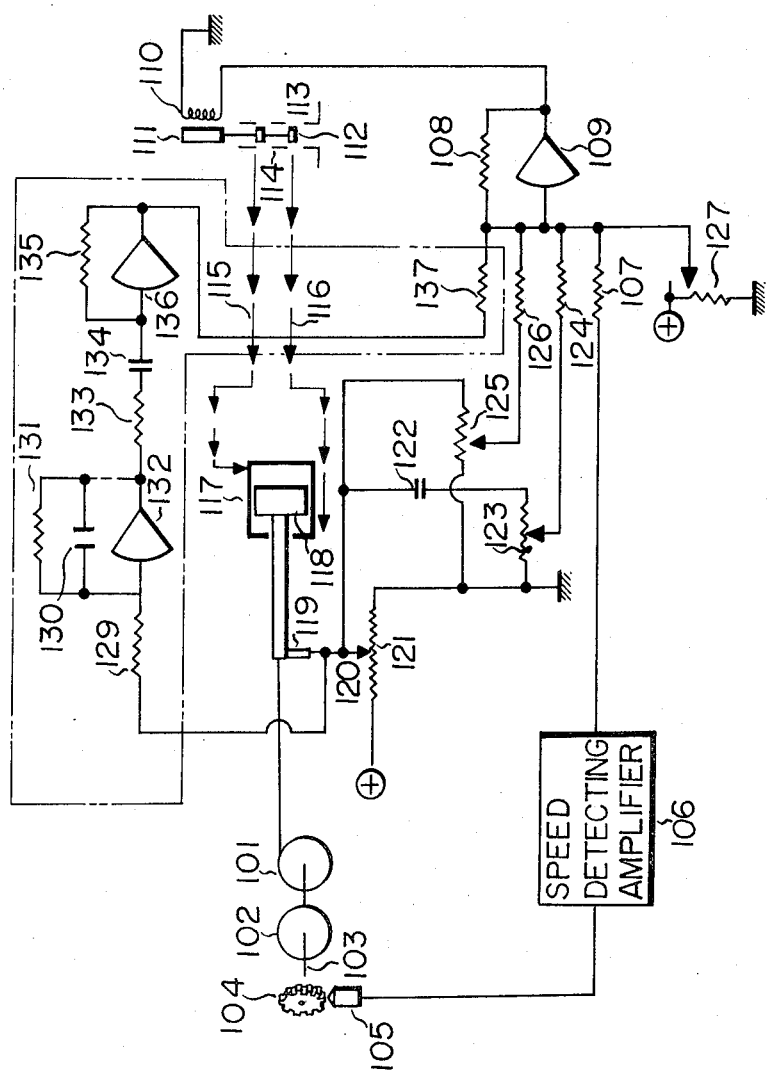

An embodiment of the present invention will now be described taking reference to FIG. 6 in which a water turbine 101 and a generator 102 is connected by a shaft 103, and the speed of the water turbine is detected in the form of a pulse signal by means of a speed signal generator 104 and a magnetic pick-up 105 which are provided on the generator shaft 103. The pulse signal is then transformed into a DC voltage and amplified by means of a speed detecting amplifier 106 and introduced into an input resistor 107 of an amplifier 109 in the form of a speed signal n. The speed signal n is amplified by the amplifier 109 and applied to a solenoid coil 110. The solenoid coil 110 produces a magnetic field which varies in accordance with the output of the amplifier 109 so as to displace the permanent magnet 111 by a distance proportional to the intensity of the magnetic field. A pilot plunger 112 is connected to the permanent magnet 111 so as to be displaced therewith and control the opening of oil ports formed in a pilot cylinder 113. Thus, the flow of pressurized oil 114 is controlled to flow to either one of oil passages 115 or 116, while the other passage being drained. Therefore, the servo piston 118 is axially shifted to control the opening of a guide vane of the water turbine 101 so as to maintain the water turbine speed constant. The position of the servo piston 118 is transmitted to the slide 120 of a potentiometer which includes a resistor 121, in the form of a voltage proportional to the position of the servo piston 118. The voltage is then transmitted through a speed setting potentiometer 125 to an input resistor 126 of the amplifier 109, and through a damping circuit comprising a condenser 122 and a potentiometer 123 to an input resistor 124 of the amplifier 109. These signal voltages are considered as being compensation signals having opposite sign as compared with the speed signal voltage applied to the input resistor 107, and fed back to the governor. The potentiometer 125 and the input resistor 126 are so adjusted as to correspond to speed drop $\delta$ as designated by the reference numeral 52 in the block diagram of FIG. 5, and the condenser 122, the potentiometer 123 and the input resistor 124 are so adjusted as to correspond to the damping item $\delta \cdot T_n \cdot D/(1+T_n \cdot D)$ which is shown by the numeral 53. The response of the servo piston 118 to the displacement of the pilot plunger 112 has an integrating characteristics as designated by 1/D in the block 51. The speed detecting section from the speed signal generator 104 to the input resistor 107 is identified as the speed detecting gain Kg in the block 50. The part essential to the present invention is encircled by a dotted line and comprises a simulating circuit 61 which corresponds to the transmitting function 57 of the water conduit which has an adverse effect on the governor control system. In the illustrated embodiment, the simulating circuit comprises resistors 129 and 131, a condenser 130 and an amplifier 132 and is identified as a circuit having first order lag characteristics satisfying the transfer function $(G_0 \cdot T_w/T_m)/(1+0.5\ G_0 \cdot T_w \cdot D)$. The guide vane opening signal Y detected by the potentiometer 121 is introduced into the simulating circuit as an input signal. The differentiating circuit 62 which is responsive only transiently is a circuit satisfying the transmitting function $T_X \cdot D/(1+T_X \cdot D)$ and comprises resistors 133 and 135, a condenser 134 and an amplifier 136. The circuit 62 is connected in series with the simulating circuit 61 so as to receive the output signal $XP_2$ of the simulating circuit 61 as an input signal and produces an output signal which is transmitted to the input resistor 137 of the governor as the output signal of a water conduit compensating circuit. The reference numeral 127 designates a speed setting resistor.

Figure 1:
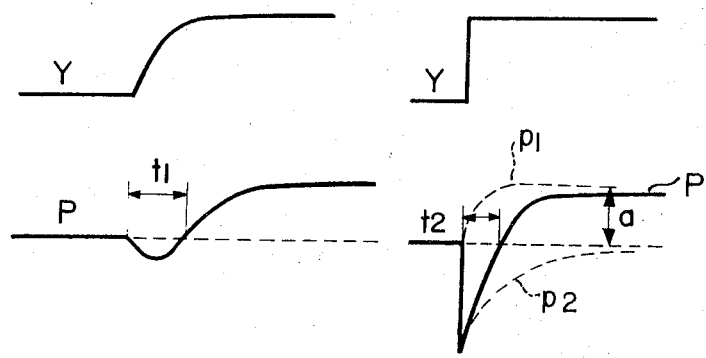
FIG. 1 is a diagram showing the inertia effect of water in a water conduit on water turbine output.
Figure 2:
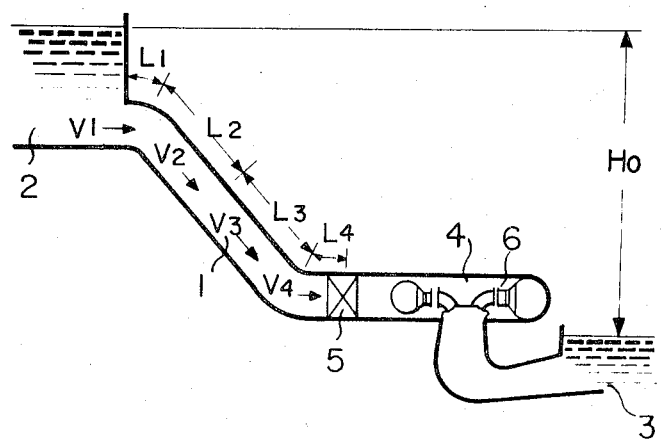
FIG. 2 is a diagrammatical view of a conventional water turbine having a water conduit.
Figure 3:
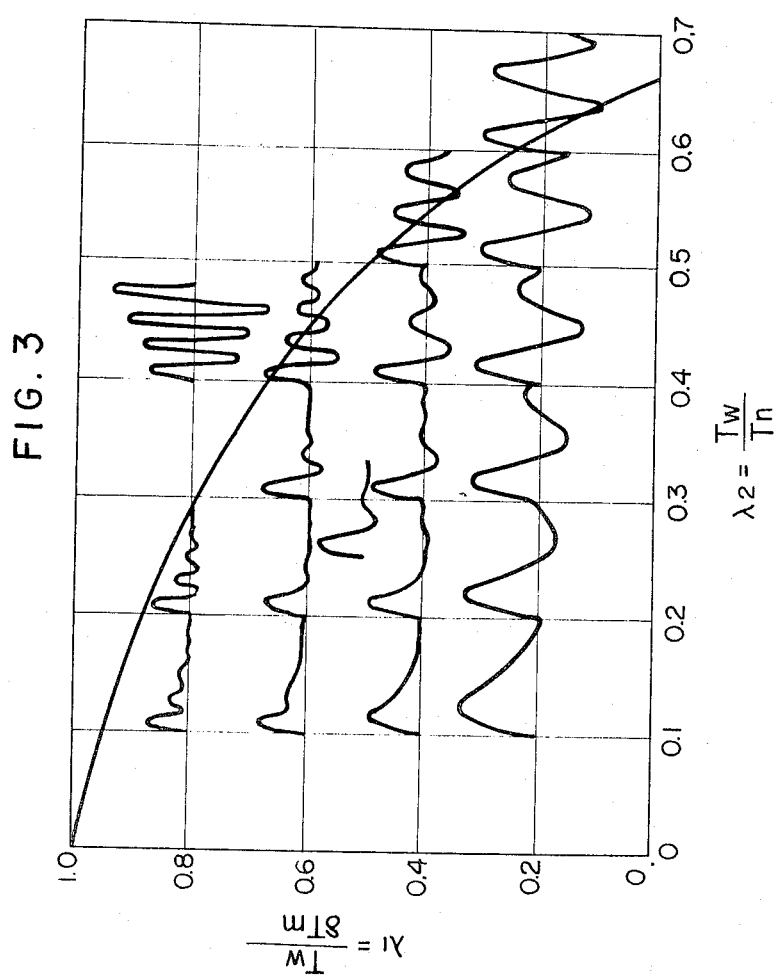
FIG. 3 is a diagram showing the relation between the damping property of a governor and the stability of the governor control system.
Figure 4:
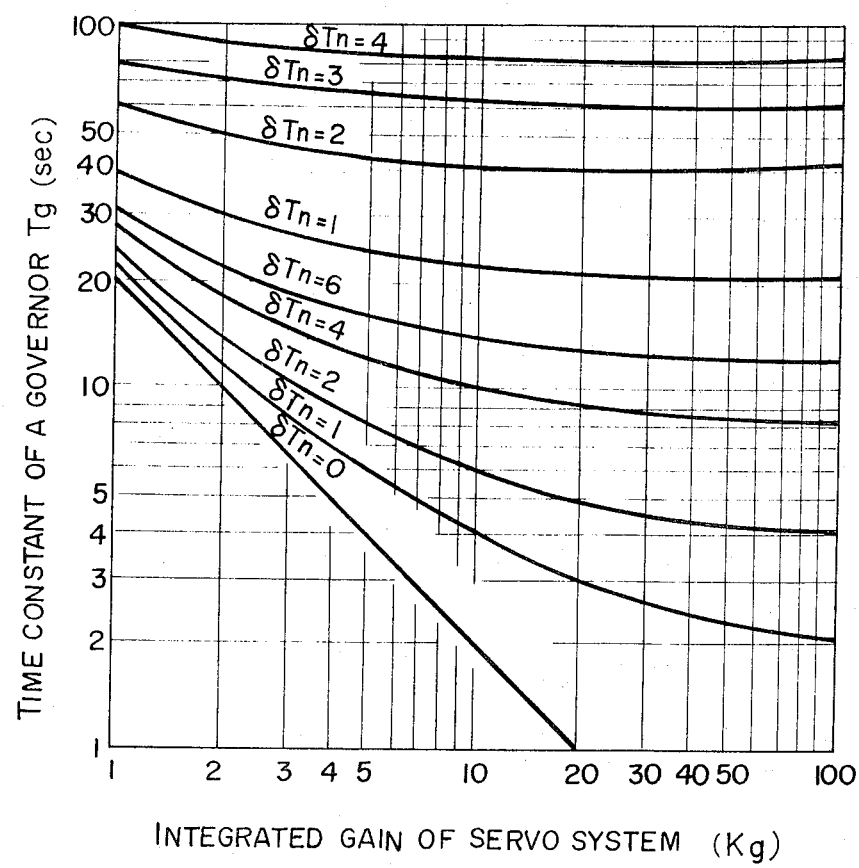
FIG. 4 is a diagram showing the relation between the damping property of a governor and the rate of response.

According to the present invention, it is possible to compensate the adverse effect of a water conduit. Therefore, the damping gain $\delta$ of the governor can be of such a value that it substantially corresponds to the primary time delay item $1/(1+0.5\ G_0 \cdot T_w \cdot D)$. Thus, the damping gain can be reduced and also the time constant $T_g$ of the whole governor can be of a smaller value as will be seen in FIG. 4. Therefore, the response rate of the control system can be improved. Further, andy adverse effect of the water conduit on the governor control system can be compensated by a simple arrangement.

Although the invention has been described as being simulated in accordance with a rigidity theorem, it is of course possible to obtain a similar result by simulating the water conduit in accordance with an elasticity theorem and compensating an adverse effect on the control system. Although in the above described embodiment the water compensating circuit is disposed in the returning circuit of the governor, it is possible to insert a similar compensating circuit in the input circuit of the governor, such as the circuit for the rotating speed signal n or the load signal $l$.

I claim:

1. A water turbine control system comprising a water turbine, a water conduit for introducing water into the water turbine, water flow adjusting means for adjusting the water flow introduced into the water turbine, means for adjusting said water flow adjusting means in accordance with load so that the speed of the water turbine is maintained substantially constant, means for simulating the inertia effect of the water in the water conduit which is a cause of instability of the water turbine control system by operating in reverse direction to a desired operation upon operation of said water flow adjusting means, and means for compensating the inertia effect of the water in the water conduit by said simulating means.

2. A water turbine control system in accordance with claim 1 which further comprises a governor which is combined with means having differentiating characteristics so that the output signal of said means for simulating the inertia effect of the water in the water conduit, which means is provided as a compensating means for the governor, is fed back only transiently during turbine load fluctuation into the input signal of the governor.

3. A water turbine control system in accordance with claim 1 in which a signal corresponding to the opening of said water flow adjusting means of the water turbine is used as the input signal of the means for simulating the water conduit which is the cause of instability of the water turbine control system, the output signal of said simulating means being fed back as one of the input signals of the governor.

* * * * *